United States Patent Office 3,324,589
Patented June 13, 1967

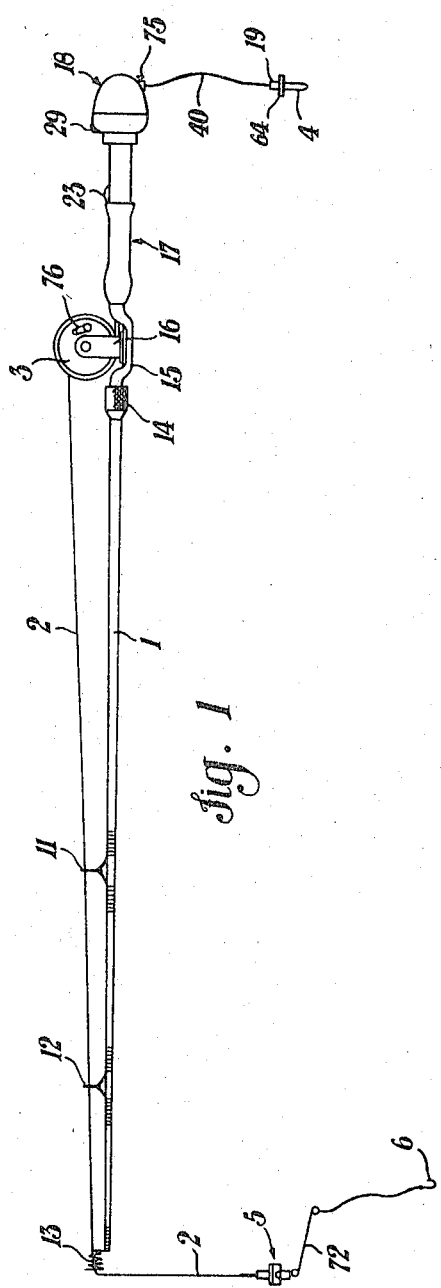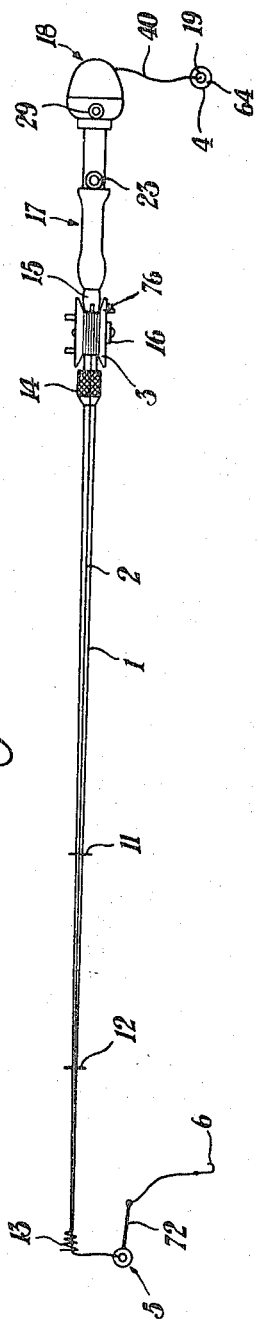

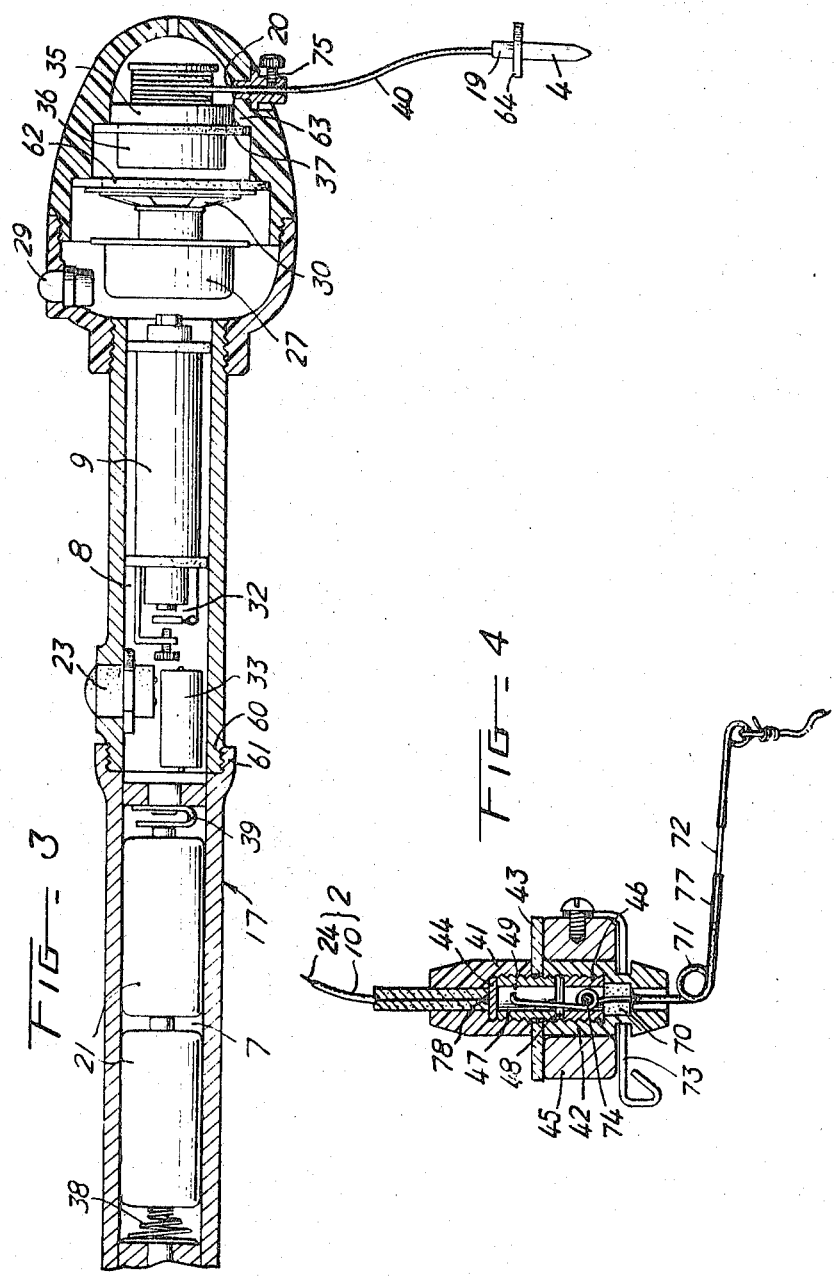

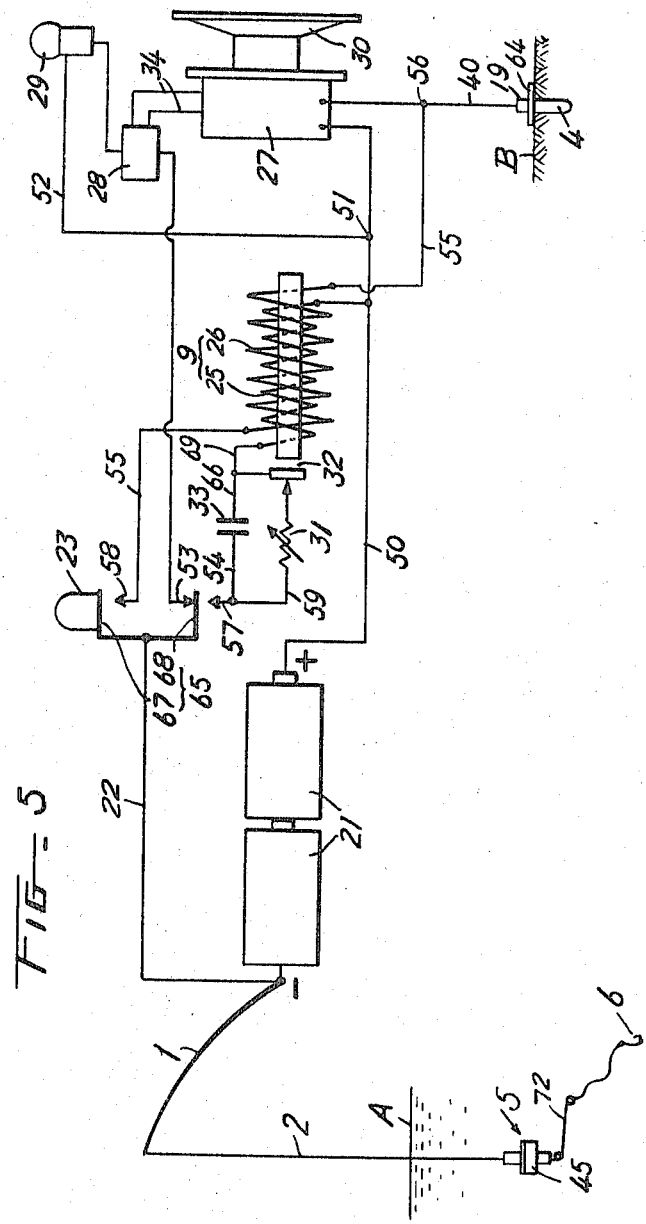

3,324,589
DEVICE FOR RETRIEVING AQUATIC
CREATURES
Soichiro Makino, 17 2-chome, Hatsudai, Shibuya-ku, Tokyo, Japan, and Masaharu Ito, 610 Kaibuchi, Kisarazu, Chiba Prefecture, Japan
Filed Oct. 21, 1964, Ser. No. 405,546
Claims priority, application Japan, Aug. 4, 1964, 39/43,874
10 Claims. (Cl. 43—17)

The present invention relates to the retrieval of aquatic creatures.

In particular, the present invention relates to a device for retrieving aquatic creatures.

Since ancient times the angling method of fishing has been known, and according to this method a hook and line are dropped into a body of water for retrieving aquatic creatures therefrom. In order to render angling more entertaining and more of a sport than it otherwise would be, it is customary to provide a line of only limited strength so that a considerable amount of skill must be acquired in order to sense when an aquatic creature is connected with the line and then to retrieve the creature without breaking the line. Although angling of this latter general type has been known for years and years, such angling is suitable only for sporting purposes and is not suitable for commercial fishing purposes. The reasons for this are, among others, that the number of aquatic creatures which can be retrieved by the ancient angling method is necessarily limited and furthermore that the creature necessarily struggles considerably before it is retrieved so that the quality of the retrieved aquatic creature is not equal to that of an aquatic creature which is retrieved without the damage to the creature resulting from the struggling thereof.

It is a primary object of the present invention to provide a device for retrieving aquatic creatures according to the angling principle but in a manner which renders such retrieval of aquatic creatures commercially feasible. Thus, with the device of the present invention it is possible to retrieve a relatively large number of creatures in a relatively short time without deleteriously affecting the quality of the retrieved creatures.

Also it is an object of the present invention to provide a device capable of retrieving aquatic creatures of all types and sizes, so that relatively large and small fish and even whales can be retrieved with the device of the present invention.

In addition, it is an object of the invention to provide a device for retrieving aquatic creatures which makes it possible for a single operator to efficiently operate a relatively large number of devices of the invention so that in this way the number of creatures which can be retrieved is much larger than can be retrieved in a given period of time with the old and well known angling methods and devices.

Furthermore, the objects of the present invention include the provision of a structure which is simple and inexpensive as well as very easy to operate.

The device of the present invention includes an electrically conductive line which is adapted to be dropped into a body of water inhabited by the creatures which are to be retrieved. An electrical circuit includes this line and is adapted to be completed through the body of water. A switch means is operatively connected with the line for closing the electrical circuit when an aquatic creature is connected to the line. An indicating means is operatively connected into the circuit to be energized when the circuit is closed by this switch means so as to indicate to the operator that a creature is connected to the line. Finally, a manually operable means is operatively connected into the circuit for transmitting through the electrically conductive line to the creature connected thereto an electrical shock of sufficient magnitude to render the creature inert, so that thereafter the creature can be retrieved by way of the electrically conductive line.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 shows in a side elevation one possible embodiment of a device according to the present invention;

FIG. 2 is a top plan view of the device of FIG. 1;

FIG. 3 is a fragmentary longitudinal sectional view, on an enlarged scale as compared to FIGS. 1 and 2, of the hollow rear portion of the pole of the invention, FIG. 3 showing structure which is housed in the hollow rear portion of the fishing pole;

FIG. 4 is a longitudinal sectional elevation illustrating the details of an automatic switch means of the invention; and FIG. 5 is a wiring diagram illustrating the electrical structure of the invention as well as the manner in which it operates.

Referring now to FIGS. 1 and 2, it will be seen that the structure illustrated therein includes an elongated fishing rod or pole 1 which, to the left of the fitting 14, as viewed in FIGS. 1 and 2, is made of a springy metal or plastic or combination of metal and plastic so that the fishing rod is capable of flexing in a manner well known in the art while returning to its straight condition due to its own resiliency when it is unloaded. The fitting 14 which is fixed to the springy part of the rod 1 threadedly connects to the latter a substantially U-shaped rigid member 15 which fixedly carries a bracket 16 on which a reel 3 is supported for rotary movement, this reel 3 serving to store the flexible fishing line 2, and the reel 3 is capable of being turned in a manner well known in the art for paying out the line as well as for rewinding the line onto the reel 3. The rod 1 carries suitable guides 11–13 for guiding the flexible line 2 along the rod 1 to the front tip portion thereof where the guide 13 is situated, and the guides 11 and 12 may be in the form of eyes while the guide 13 is in the form of a coil spring of tapered configuration having its small end connected directly to the front tip of the rod 1. The part of the line 2 which extends beyond the guide 13 terminates in a free end which carries the hook 6, this hook 6 being conventional.

The fishing line 2, however, is not conventional. As is shown most clearly in FIG. 4, the fishing line 2 includes an inner conducting wire 24 which is covered by an outer insulating sheath or layer 10 made of a suitable synthetic resin. The conductor 24 at the core of the line 2 may be made up of a number of fine electrically conductive wires which are twisted together so that while the line is quite flexible nevertheless it has considerable strength and also is of course electrically conductive. It is to be noted that the line 2 does not have the structure of a conventional conductor in that a conventional conductor will have a pair of wires insulated from each other whereas with the line 2 there is only a single conducting wire 24 which is covered by the insulation 10. Although the line 2 is composed of the inner conductive core 24 and the outer layer of insulation 10, nevertheless the total thickness of the line 2 is maintained sufficiently small to give the line 2 the appearance and feel of a conventional fishing line.

The part of the line 2 which extends beyond the front tip portion of the rod 1 carries an automatic switch means 5 which is normally open but which, in response to pulling on the line by an aquatic creature engaged by the hook 6, automatically closes so as to close an electrical circuit described below which includes the electrically conductive line 2 as well as the switch means 5.

The automatic switch means 5 is situated at a relatively short distance from the free end of the line 2 which carries the hook 6, and the details of the automatic switch means 5 are illustrated in FIG. 4. Referring now to FIG. 4, the automatic switch means 5 includes a pair of electrically conductive members 46 and 47 which are of tubular configuration and which have opposed open ends. The members 46 and 47 may be made, for example, of brass. The upper tubular member 47 is threaded into an electrically non-conductive body 41 engaging a transverse electrically conductive plate 44 which is seated in the threaded bore of the body 41, and this conductive plate 44 not only engages the upper end of the electrically conductive tubular member 47, as viewed in FIG. 4, but in addition the conductive plate 44 is welded at 78 to the end of the conductive core 24 of the line 2 which extends into the body 41 in the manner shown in FIG. 4. The body 41 has an elongated bore portion extending upwardly from the plate 44 and having a smaller diameter than the threaded bore portion which receives the exterior threads of the tubular member 47, and this smaller bore portion is filled with a suitable plastic which surrounds the portion of the line 2 which extends into the body 41 to be fixed to the plate 44 as by being soldered or welded thereto at 78. It is to be noted that the plastic material in the upper bore portion of smaller diameter of the body 41 closes the latter in a fluid-tight manner and covers that part of the core 24 which has the insulation 10 stripped therefrom so as to extend into the bore of the body 41, this plastic material extending all the way up to the insulation 10, as shown in FIG. 4, so that in this way none of the conductor 24 is directly exposed to the body of water.

The threaded tubular member 47 extends through an opening of a rigid insulating plate 43 into a threaded bore of a lower plastic member 42 so as to pull the members 41 and 42 tightly against the opposed faces of the plate 43, and the second electrically conductive tubular member 46 is threaded into the body 42 so as to be carried thereby but is spaced from the tubular member 47 so that in this way the electrically conductive members 46 and 47 of the switch means 5 are maintained insulated from each other.

The elongated plastic body 42, which can be made of any suitable synthetic resin, for example, is thus fixed by the exterior threads of the electrically conductive tubular member 47 not only to the latter but also to the transverse rigid plate 43 which is not electrically conductive and of course through the member 47 to the body 41. Adjacent its lower end the body 42 is formed with an exterior groove receiving part of a wire 73 which is fixed to a sinker 45 made of any suitable heavy material such as lead and surrounding the body 42, so that by location of the wire member 73 in the exterior groove of the member 42 the sinker 45 will be retained in its position shown in FIG. 4 surrounding the member 42 and engaging the underside of the plate 43.

At approximately its portion which is provided with the exterior annular groove, the tubular plastic member 42 is closed by a plug 70 made of rubber, for example, and a bore which passes through the plug 70 enables a relatively heavy springy wire member 72 to extend into the interior of the tubular member 46. The bore of the plug 70 is initially considerably smaller than the diameter of the wire 72 so that the plug 70 tightly grips the wire 72 to form a fluid-tight connection therewith, and in addition the outer diameter of the plug 70 initially is greater than the inner diameter of the part of the tubular member 42 which receives the plug 70, so that the plug 70 is compressed in the plastic member 42 and forms a fluid-tight closure therefor.

The electrically conductive tubular member 46 carries a cross pin 74 about which part of the conductor 72 is coiled, so that in this way the cross pin 74 forms a pivot supporting the relatively rigid wire member 72 for turning movement, and the upper free end of the wire 72, as viewed in FIG. 4, extends into the hollow interior of the electrically conductive member 47 but normally does not engage the latter, so that the switch is normally open. At its portion which extends downwardly beyond the plug 70 the relatively heavy and relatively rigid wire 72 is provided with a convolution 71 so that the wire 72 extends laterally from the common axis of the tubular members 46 and 47, and at its outer free end the wire 72 is formed with a loop to which the remainder of the line 2 is connected, this remainder of the line 2 terminating in the free end thereof to which the hook 6 is connected. The metal hook 6 directly engages the conductor 24, and the conductor 24 directly engages the metal wire 72 at the free looped portion thereof. Except for these metallic contacts, however, the wire 72 is covered with insulation 77, and this insulation also covers the portion of the wire 72 at the end loop thereof which is engaged by the conductor of the part of the line 2 which carries the hook 6, so that at the connection of the conductor 24 of the line connected to the hook 6 to the wire 72 there is also a covering of insulation. In this way the metal hook 6 is placed in electrical connection with the wire 72 which extends into the interior of the hollow member 47. With this construction the resiliency of the plug 70 will itself tend to maintain the upper free end of the wire 72 at a location extending into but not engaging the metallic member 47. However, when an aquatic creature engages the hook 6 so as to pull on the free end of the line 2, the relatively rigid wire 72 will tend to be turned in a clockwise direction, as viewed in FIG. 4, about the pivot 74, and the compressible resilient plug 70 will at this time yield sufficiently to enable the free end 49 of the wire 72 to be displaced into engagement with the inner surface of the tubular member 47, so that in this way the switch means is automatically closed in response to connection of an aquatic creature with the line 2.

Inasmuch as the automatic switch means 5 will under some circumstances be dropped to considerable depth in a body of water where there is considerable pressure, it is advisable to fill the interior of the tubular members 46 and 47 as well as the space therebetween with a suitable oil which is insulating and which at the same time is capable of opposing the pressure of the body of water. In this way the body of water is reliably maintained out of the interior of the automatic switch means 5.

As was pointed out above, the bracket 16 is carried by the U-shaped portion 15 of the rod 1, and the bracket 16 supports the reel 3, this reel 3 being provided with a stop mechanism 76 which stops the rotation of the reel when the electrically conductive line is fully paid out therefrom.

The member 15 is connected to the front end of an elongated hollow rear portion 17 of the fishing rod 1, this elongated hollow rear portion 17 being rigid and made of a suitable plastic or of a metal which is covered with plastic at least at its interior so as to not be electrically conductive. As is particularly apparent from FIG. 3, the hollow rear portion 17 of the fishing pole 1 includes a plurality of pipe sections which are releasably fastened together by a fastening means formed by the threads 60 and 61 at the adjoining ends of the sections, and in this way the sections of the hollow rear portion 17 can be separated from each other to give access to the interior of the hollow rear portion of the fishing rod 1. At its rearmost portion the hollow rod carries a plastic housing 18 which serves to house the indicating means of the invention as well as some of the electrical components thereof and a means for storing a ground connection means described below. The front pipe section of the hollow rear portion 17 defines a hollow interior chamber 7 in which a source of current formed by batteries 21 is situated, while the other pipe secton defines a hollow interior chamber 8 which houses additional electrical components such as the manually operable switch 23, which is accessible at the exterior of the pole, the spark coil 9 and the vibrator or circuit interrupter 32 which cooperates therewith, the condenser 33, and the remaining electrical elements which are not shown in FIG. 3 but which are described below in connection with FIG. 5. At the left end of the chamber 7 is situated a spring 38 urging the batteries 21 into engagement with a conductor 39 which serves to connect the batteries into the electrical circuit which includes the components in the chamber 8 as well as in the housing 18, and a part of the conductor 2 which is never unwound from the reel 3 is electrically connected with the batteries 21 so that the conductor 24 at the core of the line 2 is in this way connected into the circuit, and of course in this way also the automatic switch means 5 is connected into the circuit.

The housing 18 at the rear end of the pole 1 houses an audio oscillator or tone generator 27 which is connected with a sound amplifier 30 so as to create therewith an audible signal when the tone generator 27 is energized, and thus this assembly forms an indicating means for giving to the operator an audible signal.

Also situated within the housing 18 is a spring barrel 36 housing a spring which is operatively connected to a reel 35 so as to tend to turn the latter in a direction which will wind onto the reel an electrical conductor 40 which is suitably insulated by a covering of insulation and which is capable of sliding through the tubular member 20 which is carried by the wall of the housing 18. A plate 62 determines the location of the sound amplifier 30 and the tone generator 27, the amplifier 30 being directly connected to the plate 62, while a plate 37 serves to mount the spring barrel 36 and the reel 35 in the interior of the housing 18. A set screw 75 is threadedly carried by the tube 20 for pressing against the conductor 40 so as to maintain the latter with a predetermined length thereof extending outwardly beyond the housing 18, and when the set screw 75 is loosened the spring in the barrel 36 will automatically rewind the conductor onto the reel 35. The conductor 40 terminates at its outer end in a member 19 which is electrically connected with the wire of the conductor 40 and which is fixed to a disc 64 which in turn is fixed to a relatively sharp peg 4 which is electrically conductive and which can be introduced into the ground B, as shown in FIG. 5, for providing a ground connection through the conductor 40, although when fishing from a vessel which is not near the shore the conductor 40 may simply be dropped into the body of water so that the end assembly 4, 19, 64 thereof will simply sink into the water to provide the circuit which is completed in the body of water in a manner described below. Member 64 simply forms a washer which limits the depth to which the peg 4 can be inserted into the ground.

The audio oscillator 27 can be transistorized so that its size can be maintained quite small.

When the end 4 of the ground connection means 40 is inserted into the ground B which adjoins the body of water A (FIG. 5) or into the body of water itself, then an electrical circuit can be completed directly through the body of water, the hook 6 itself forming part of the circuit.

Referring now to FIG. 5, it will be seen that in the illustrated example the electrically conductive line 2 is connected to the negative pole of the battery assembly 21 while the positive pole thereof is connected through the conductor 50 to the audio oscillator 27 which is connected through the conductors 34 to a normally open relay 28 connected to a stationary contact 53 which is engaged by a U-shaped member 65 of the manually operable switch means 23 when the latter is in its rest position, this switch means 23 having its member 65 connected through a conductor 22 to the negative pole of the current source 21, and in addition there is a ground connection of the oscillator 27 provided through the conductor 40 as shown in FIG. 5. A suitable spring urges the U-shaped member 65 of the manually operable switch means 23 to the position illustrated in FIG. 5 where it engages the stationary contact 53.

Therefore, with this construction when an aquatic creature engages the hook 6 so as to pull on the member 72 the automatic switch means 5 will close and the audio oscillator 27 will be energized to provide an audible signal through the amplifier 30.

In addition, the relay 28 is connected to the lamp 29 which is visible at the exterior of the housing 18, as shown in FIG. 3, and this lamp 29 is connected through a conductor 52 to a connection 51 of the line 50, so that the lamp 29 will also be energized so as to provide a visible signal. For operation at night it is preferred to use the visible indicating means 29 while operation in daylight will generally be better with an audible signalling means 27, 30.

In either event, it is clear that with the structure of the invention when a fish or other aquatic creature is connected to the hook 6 the switch 5 will close automatically so as to energize the indicating means 27 and/or 29 so as to indicate to the operator the fact that an aquatic creature is connected to the electrically conductive line 2.

The spark coil 9 includes an iron core at one end of which the interruptor or vibrator 32 is situated, and the core is surrounded by a primary coil 25 and a secondary coil 26. The primary coil 25 is connected at one end to the conductor 50 while the secondary coil 26 is connected by conductor 55 to the connection 56 of the grounding wire 40. The primary coil 25 is connected through a conductor 69 with a circuit 66 which includes the capacitor 33 in the branch 54 of the circuit 66, and this circuit 66 includes not only the vibrator or circuit interrupter 32 but also the variable resistor 31 which can be adjusted in accordance with the characteristics of the device when it is initially assembled and which is situated in the branch 59 of the circuit 66. This circuit is connected to a stationary conductor 57 which is situated in the path of movement of the end 68 of the U-shaped member 65 when the operator depresses the manually operable switch 23. It is to be noted that the other end of the secondary coil 26 is connected also by the conductor 55 to a stationary contact 58 which is situated in the path of movement of the upper portion 67 of the U-shaped member 65 of the manually operable switch means 23, so that when the operator depresses the latter the conductor 65 will move away from the contact 53 and into engagement with the pair of contacts 57 and 58. In this way the circuit of the indicating means 27 and/or 29 will be interrupted while the circuit of the spark coil 9 will be energized, and as long as the operator maintains the switch 23 depressed an electrical shock will be transmitted through the conductive wire 2 and through the closed switch 5 to the hook 6 to subject the aquatic creature connected thereto to the electric shock, and the operator will apply a shock of sufficient magnitude to render the aquatic creature inert, at least temporarily, so that in this way the creature can be very easily retrieved in a minimum amount of time, even though thereafter the creature may revive.

Of course, the above-described structure is but one example of a possible application of the principles of the invention. Thus, the invention can equally well be used to retrieve whales in which case instead of a fishing rod a harpoon would be used, and the circuit would be completed when the tip of the harpoon enters into the whale so that the pull of the whale on the line will close the automatic switch means 5 in order to energize the circuit as described above, and then of course the operator can still actuate the structure shown in FIG. 5 which now would be mounted on a different supporting assembly so as to transmit an electrical shock to the whale in order to render the whale inert.

The line 2 can have its insulation 10 provided with different colors over successive portions thereof of predetermined lengths, so that by noting the color of the insulation 10 at the water surface the operator will know the depth to which the hook 6 has sunk. These portions of different colors may have a length of 5 to 10 meters, and thus in this way an indication can be given to the operator of the depth of the creature.

The spark coil 9 is in the actual construction relatively short and does not occupy a very large space.

With the structure of the invention it is possible to retrieve the aquatic creatures without requiring the operators to have any special sporting skill. Furthermore, it is possible for one operator to operate a relatively large number of fishing poles carrying the structure of the invention. When the indicating means of any one pole is energized the operator can attend to that pole so as to provide the electrical shock and retrieve the aquatic creature in an extremely short time while the other poles still are operative.

Furthermore, with the structure of the invention the electrical shock is confined to the aquatic creature in engagement with a particular hook, so that other creatures in the vicinity of the hooked creature will not be frightened away.

In addition, since the hook 6 is almost always engaged by the mouth of the aquatic creature, the shock is transmitted almost directly to the brain of the creature so that the flesh of the creature is completely uninfluenced by the structure and is retrieved in a fresh manner which is completely undamaged and which is of the highest possible quality.

It is furthermore to be noted that with the structure of the invention because there is no particular struggle of the aquatic creature the stresses to which the equipment is subjected are extremely small, and in addition the operator need not exert a very large amount of energy and is under no particular danger of being pulled into the water.

In addition, the operator can maintain the electric shock for a period determined by the duration that the operator maintains the switch 23 depressed. This length of time that the operator will maintain the switch 23 closed in its lower position, as viewed in FIG. 5, providing the electric shock, will be decided according to the speed with which the hooked creature is moving, as judged by the speed with which the line is being pulled from the reel, and of course if the operator knows in advance what creatures are swimming in the body of water he can know what duration of shock to provide. In the case of an eel, for example, since these creatures can withstand considerable electrical shock, more prolonged shocks are provided by maintaining the switch 23 depressed for a longer period of time. The dry cells 21 may, for example, by 1.5 volt batteries, and a considerable shock can be derived therefrom by way of the induction coil 9. The structure can be used for many types of fish such as salmon, trout, yellowtail, tuna, etc. Moreover, in addition to whale, as mentioned above, the structure of the invention may be used for capturing seal and walrus. Of course with these latter creatures as in the case of a whale a harpoon will be fired from a gun, but otherwise the structure will be substantially identical with that described above. It is to be noted that particularly in the retrieving of whale there is a vast improvement provided by the invention since once the harpoon has attached itself to a whale, the whale can be retrieved in a relatively short time with the structure of the invention, whereas with the ancient whaling techniques as practiced over the years up to the present time once the harpoon is attached to the whale it is sometimes required to follow the whale with the harpoon attached thereto for a period of twenty-four hours or more. With the invention the whale or other creature which is harpooned will only bear the scar of the harpoon and will not otherwise be damaged. However, when dealing with rather large creatures such as whale, seal, or walrus, it is advisable, if possible, to aim the harpoon at the head of the creature so as to transmit the electric shock as much as possible to the brain of the creature.

As may be seen from FIG. 3 the right end of the batteries 21 engage a conductor 39 which serves to transmit the electrical current through the circuit of FIG. 5 to the components in the chamber 8 and in the housing 18.

The relay 28 is a normally open relay which upon being energized by closing of the automatic switch means 5 closes so as to complete the circuits to the indicating means in the indicator circuit portion 52.

In practice, when a fish has received an electric shock from the structure of the invention, not only does the fish become inert, in addition it closes its mouth and becomes quite rigid, so that it is an extremely simple matter to very reliably retrieve the fish in a short time.

As was pointed out above, aquatic creatures in the neighborhood of the one which is caught are not frightened away. The shock is in the form of a high voltage current of a given intensity, and if this current is simply allowed to run off it will be transmitted to the fish which are about to bite and will frighten them away. However, it will be noted that with the invention the shock is only transmitted after the fish has been hooked, so that there is no particular hindrance to the fish taking the bait and the fishing operations can be carried out quite efficiently with the invention.

While it has been pointed out above that it is preferred to use the lamp 29 as an indicator at night and the tone generator 27 as an indicator in the daytime, it is of course also possible to use both of these indicating structures simultaneously, and the circuit of FIG. 5 will produce this result.

Although considerable advantages of the invention have been mentioned above, such as the simplicity of the operation which does not require any particular skill and the speed with which the creatures can be very rapidly retrieved, there are still other advantages. For example, there is no particular loss of hooks with the structure of the invention so that the equipment can be used repeatedly without any risk of any loss such as is normally encountered in conventional angling. Furthermore, since the creature is inert it is not necessary to provide retrieval nets of any large magnitude, and thus the equipment for retrieveing the creatures from the fishing line can be small and light.

Furthermore, since the creature is rendered inert the stresses on the equipment which normally are encountered by a struggling creature are eliminated very shortly after the creature seizes the hook, so that the equipment of the invention can be made relatively light. In this connection it is to be noted that the inert creature will be buoyed up by the water so that even a relatively large creature can be retrieved with considerable ease with the structure of the invention. Thus, in the case of harpooning, it is not necessary to have firing equipment of substantial size. The gun which is used with the harpoon can be made quite small with the structure of the invention and a simple rifle will ordinarily suffice.

It will be understood that each of the elements described above, or two or more together, may also find a useful application in other types of retrieval of aquatic creatures differing from the types described above.

While the invention has been illustrated and described as embodied in fishing structures, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and and desired to be secured by Letters Patent is:

1. In a device for retrieving aquatic creatures, in combination, an electrically conductive line adapted to be dropped into a body of water inhabited by creatures to be retrieved; an electrical circuit including said line and adapted to be completed through the body of water; switch means operatively connected with said line for closing said electrical circuit when an aquatic creature is connected to said line; indicating means operatively connected to said circuit to be energized upon closing thereof by said switch means for indicating to the operator that a creature is connected to said line; and manually operable electrical means operatively connected to said circuit for transmitting through said line to a creature connected thereto an electrical shock of sufficient magnitude to render the creature inert, so that thereafter the creature can be retrieved by way of said line.

2. In a device as recited in claim 1, said manually operable electrical means, when actuated to transmit a shock through said line to the creature connected thereto, simultaneously disconnecting said indicating means from said circuit so as to deenergize said indicating means.

3. In a device as recited in claim 1, said line having a free end to which an aquatic creature is adapted to be connected, and said switch means automatically responding to a pull on said free end of said line by an aquatic creature for closing said circuit.

4. In a device as recited in claim 3, said line having an elongated portion which includes said free end thereof and which is separated from the remainder of said line, said switch means including a first electrically conductive member connected electrically with said remainder of said line, a second electrically conductive member, means supporting said members in predetermined positions relative to each other while maintaining them out of electrical connection with each other; a switch member movably carried by said second member and connected electrically therewith, said first electrically conductive member being located in the path of movement of said switch member so that said switch means is closed when said first electrically conductive member is engaged by said switch member, and said switch member being connected to said elongated portion of said line to be moved to a position engaging said first electrically conductive member when an aquatic creature engages and pulls on said end of said line.

5. In a device as recited in claim 3, said switch means including a pair of coaxial electrically conductive tubular members situated adjacent but spaced from each other, said line having an elongated end portion which includes said free end thereof and one of said tubular members being electrically connected with the remainder of said line; electrically non-conductive support means supporting said tubular members; a switch member electrically connected to the other of said tubular members, extending into said one tubular member and pivotally carried by said other tubular member for turning movement into engagement with said one tubular member for closing said circuit, and said switch member being connected to said end portion of said line to be turned, when the latter is pulled, into engagement with said one tubular member.

6. In a device as recited in claim 1, said manually operable electrical means including a spark coil and a circuit interruptor operatively connected thereto, and a manually operable switch having a rest position disconnecting said spark coil and interruptor from the circuit and connecting said indicating means into the circuit, said manually operable switch when actuated by the operator disconnecting said indicating means from the circuit and connecting said spark coil and interruptor into the circuit for transmitting a shock through said line to the creature connected thereto.

7. A device for retrieving aquatic creatures, comprising, in combination, an elongated fishing pole having a rear elongated hollow portion and a front tip portion; a reel carried by said pole; an electrically conductive line stored on said reel; guide means guiding said line for movement from said reel along said pole to and beyond the tip portion thereof, said line having an elongated portion extending beyond said front tip portion of said pole; automatic switch means carried by said elongated portion of said line for responding to tension in part of the line which extends beyond said switch means so as to become automatically closed, said switch means otherwise being normally open; a source of current carried by said pole in said hollow portion thereof; electrical indicating means also carried by said pole in said hollow portion thereof; ground connection means extending from the hollow rear portion of said pole to the exterior thereof to engage the ground or a body of water for forming a ground connection; a spark coil and a circuit interruptor cooperating therewith, said coil and interruptor also being situated in said hollow rear portion of said pole; a manually operable switch means extending from the interior of said hollow rear portion of said pole to the exterior thereof so as to be accessible to the operator; and an electrical circuit connecting said electrically conductive line with said source of current, said indicating means, said spark coil and interruptor, said ground connection means, and said manually operable switch means for automatically energizing said indicating means when said automatic switch means is closed so as to indicate to the operator that said automatic switch means is closed and for disconnecting said indicating means from said circuit and connecting said spark coil and interruptor into said circuit, upon actuation of said manually operable switch means, for then transmitting an electric shock through said line.

8. A device as recited in claim 7 and wherein a winding means is carried by said hollow rear portion of said pole for winding substantially all of said ground connection means into the interior of said hollow rear portion of said pole.

9. A device as recited in claim 7 and wherein a sinker is connected to said automatic switch means.

10. A device as recited in claim 7 and wherein said hollow rear portion of said pole includes a plurality of pipe sections and a fastening means releasably fastening said pipe sections to each other so that said pipe sections can be separated to give access to the interior of said hollow rear portion of said pole for changing said source of current, and the like.

References Cited

UNITED STATES PATENTS

| | | | |
|---|---|---|---|
| 648,505 | 5/1900 | Lindbohm | 43—18 |
| 1,838,981 | 12/1931 | Anderson | 43—17.1 |
| 2,331,665 | 10/1943 | Douglas et al. | 43—17 |
| 2,922,243 | 1/1960 | Weaver et al. | 43—17 |
| 2,948,076 | 8/1960 | Patricello | 43—17 |
| 3,083,491 | 4/1963 | Meysan et al. | 43—17.1 |

FOREIGN PATENTS

| | | |
|---|---|---|
| 666,621 | 5/1929 | France. |
| 776,670 | 11/1934 | France. |
| 875,588 | 5/1953 | Germany. |
| 380,422 | 9/1932 | Great Britain. |

SAMUEL KOREN, *Primary Examiner.*

W. H. CAMP, *Assistant Examiner.*